United States Patent
Hu et al.

(10) Patent No.: US 10,932,092 B2
(45) Date of Patent: Feb. 23, 2021

(54) METHOD FOR ESTABLISHING LOCAL NETWORK CONNECTION, TERMINAL AND NETWORK DEVICE

(71) Applicant: Huawei Technologies Co., Ltd., Shenzhen (CN)

(72) Inventors: Yong Hu, Shenzhen (CN); Qianghua Zhu, Beijing (CN); Fenqin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/511,531

(22) Filed: Jul. 15, 2019

(65) Prior Publication Data

US 2019/0357014 A1     Nov. 21, 2019

Related U.S. Application Data

(63) Continuation of application No. PCT/CN2018/081497, filed on Apr. 1, 2018.

(30) Foreign Application Priority Data

Apr. 19, 2017  (CN) .......................... 2017 1 0257325
Feb. 13, 2018  (CN) .......................... 2018 1 0148817

(51) Int. Cl.
  *H04W 4/00*  (2018.01)
  *H04W 4/029*  (2018.01)
  (Continued)

(52) U.S. Cl.
  CPC ............. *H04W 4/029* (2018.02); *H04W 8/08* (2013.01); *H04W 76/11* (2018.02); *H04W 80/10* (2013.01)

(58) Field of Classification Search
  CPC ....... H04W 4/029; H04W 76/11; H04W 8/08; H04W 80/10
  See application file for complete search history.

(56) References Cited

U.S. PATENT DOCUMENTS

2012/0207104 A1    8/2012  Liang et al.
2014/0086214 A1*   3/2014  Hong ...................... H04W 4/70
                                                    370/332
(Continued)

FOREIGN PATENT DOCUMENTS

CN    101730187 A    6/2010
CN    102056321 A    5/2011
(Continued)

OTHER PUBLICATIONS

Machine Translation and Abstract of Chinese Publication No. CN101730187, Jun. 9, 2010, 18 pages.
(Continued)

*Primary Examiner* — Abdelnabi O Musa
(74) *Attorney, Agent, or Firm* — Conley Rose, P.C.

(57) ABSTRACT

A method for establishing a local network connection, where the method includes: obtaining, by a terminal, broadcast information sent by a base station; if the broadcast information includes a first local data network (LDN) list, determining a target local network identifier based on the first LDN list, where the first LDN list includes at least one local network identifier; and establishing, by the terminal, a session connection using the target local network identifier.

13 Claims, 8 Drawing Sheets

(51) Int. Cl.
*H04W 76/11* (2018.01)
*H04W 8/08* (2009.01)
*H04W 80/10* (2009.01)

(56) References Cited

U.S. PATENT DOCUMENTS

| | | |
|---|---|---|
| 2016/0044591 A1 | 2/2016 | Pao et al. |
| 2016/0119861 A1 | 4/2016 | Jin |
| 2017/0374610 A1 | 12/2017 | Kim et al. |
| 2018/0192390 A1* | 7/2018 | Li ................. H04W 28/02 |
| 2018/0279397 A1* | 9/2018 | Faccin .............. H04W 48/14 |
| 2018/0352448 A1* | 12/2018 | Ryu .................. H04W 8/04 |
| 2019/0037516 A1* | 1/2019 | Kim ................. H04W 60/005 |
| 2019/0052630 A1* | 2/2019 | Lapidous ........... H04L 63/083 |
| 2020/0221529 A1* | 7/2020 | Park ................. H04W 76/25 |

FOREIGN PATENT DOCUMENTS

| | | |
|---|---|---|
| CN | 102833682 A | 12/2012 |
| CN | 105376832 A | 3/2016 |
| EP | 2983411 A1 | 2/2016 |
| EP | 3001733 A1 | 3/2016 |
| WO | 2015003323 A1 | 1/2015 |
| WO | 2015142245 A1 | 9/2015 |
| WO | 2016126109 A1 | 8/2016 |

OTHER PUBLICATIONS

Machine Translation and Abstract of Chinese Publication No. CN102833682, Dec. 19, 2012, 42 pages.
"3rd Generation Partnership Project; Technical Specification Group Services and System Aspects; System Architecture for the 5G System; Stage 2 (Release 15)," 3GPP TS 23.501 V0.3.1, Mar. 2017, 97 pages.
"3rd Generation Partnership Project; Technical Specification Group Services and System Aspects; Procedures for the 5G System; Stage 2 (Release 15)," 3GPP TS 23.502, V0.2.0, Feb. 2017, 71 pages.
Foreign Communication From a Counterpart Application, PCT Application No. PCT/CN2018/081497, English Translation of International Search Report dated Jun. 27, 2018, 2 pages.
Foreign Communication From a Counterpart Application, PCT Application No. PCT/CN2018/081497, English Translation of Written Opinion dated Jun. 27, 2018, 4 pages.
Foreign Communication From a Counterpart Application, European Application No. 18788422.6, Extended European Search Report dated Nov. 20, 2019, 9 pages.

* cited by examiner

METHOD FOR ESTABLISHING LOCAL NETWORK CONNECTION, TERMINAL AND NETWORK DEVICE

CROSS-REFERENCE TO RELATED APPLICATIONS

This application is a continuation of International Patent Application No. PCT/CN 2018/081497, filed on Apr. 1, 2018, which claims priority to Chinese Patent Application No. 201710257325.1, filed on Apr. 19, 2017, and Chinese Patent Application No. 201810148817.1, filed on Feb. 13, 2018. The disclosures of the aforementioned applications are hereby incorporated by reference in their entireties.

TECHNICAL FIELD

This application relates to the field of wireless communications technologies, and in particular, to a method for establishing a local network connection, a terminal, and a network device.

BACKGROUND

A local network is a network that covers a particular local area, for example, a network that covers a place such as an enterprise campus, a campus, an airport, a railway station, a large-scale shopping center, or a gymnasium. A user equipment (UE) accesses a local gateway through a radio access network, to directly access a corresponding local network instead of accessing an external data network, thereby reducing an application access delay and occupied backbone network bandwidth. For example, live virtual reality (VR) broadcast is provided in a gymnasium, campus communication is provided in a campus for accessing a learning resource in the campus, industrial control communication is provided in an enterprise campus, or local shopping discount push and real-time location navigation are provided in a mall.

In a new-generation communications system, as Mobile Edge Computing (MEC) emerges and a gateway location is close to users, more and more such local network services will emerge, to enable a user to obtain better service experience and cooperate with localized deployment of a content source. However, a local network covers only a particular local area, and UE does not know which local network covers a particular region. Therefore, a network side needs to deliver related information of a local network, to notify the UE. However, when the network side delivers a message to the UE, if a location of the UE changes as the UE moves when the user is in an idle state, a current location of the UE and a cell corresponding to the current location cannot be precisely determined. Consequently, it is difficult to accurately push the local network to the UE.

In a current method in which the network side delivers related information of a local network, after receiving the related information delivered by the network side, the UE determines, based on the related information and a current location of the UE, whether the UE is located in an area covered by the local network. However, currently a granularity of the local network coverage area is not defined and may be a cell granularity or a tracking area (TA) granularity, and the local network area may be of a plurality of location types, for example, a 3rd Generation Partnership Project (3GPP) type or a non-3GPP type. As a result, the UE needs to understand different location granularities and types when determining a local network coverage area, and therefore processing complexity of the UE is increased.

In addition, as MEC emerges, there will be many local networks in the future. In this case, the UE needs to store a large amount of information about the local networks and corresponding local network coverage areas. However, actually, when determining whether the current location of the UE is within a local network coverage area, the UE needs only information about a local network supported by the current location. Therefore, a large quantity of storage resources are further occupied if the UE stores the large amount of information about the local networks.

SUMMARY

This application provides a method for establishing a local network connection, a terminal, and a network device, to reduce processing complexity of UE.

According to a first aspect, this application provides a method for establishing a local network connection. The method includes: obtaining, by a terminal such as a UE, broadcast information sent by a base station; determining whether the broadcast information includes a first local data network (LDN) list, where the first LDN list includes at least one local network identifier; if the broadcast information includes the first LDN list, determining, based on the first LDN list, a local network identifier as a target local network identifier; and establishing, using the target local network identifier, a session connection to a local network corresponding to the target local network identifier.

In the method provided in this aspect, the UE obtains the broadcast information sent by the base station. Because the broadcast information includes the LDN list that includes the at least one local network identifier, the UE can determine, based on local network identifiers that are obtained at a current location, the target local network identifier for establishing a session connection, and quickly establish the session connection. This avoids storing a large amount of related information of local network coverage areas in the UE, saves a storage resource of the UE, and also reduces processing complexity of the UE when the UE determines a local network coverage area, thereby improving local network connection efficiency.

With reference to the first aspect, in a first implementation of the first aspect, a process of determining, by the terminal, the target local network identifier based on the first LDN list includes: selecting, by the terminal, a local network identifier from the first LDN list according to a local policy; and using, by the terminal, the selected local network identifier as the target local network identifier. The local policy includes a priority order of locally configuring LDNs, and the like, and is not limited in this aspect.

With reference to the first aspect, in a second implementation of the first aspect, a process of determining, by the terminal, the target local network identifier based on the first LDN list further includes: obtaining, by the terminal, a second LDN list from a network side such as a control plane node, where the second LDN list may include all user-subscribed local network identifiers, or may include a subscribed local network identifier that is based on a location area in which the terminal is located; and determining, by the terminal, the target local network identifier based on the first LDN list and the second LDN list.

With reference to the second implementation of the first aspect, in a third implementation of the first aspect, a process of determining, by the terminal, the target local network identifier based on the first LDN list and the second LDN list includes: comparing, by the terminal, the first LDN list with the second LDN list, to determine whether an intersection set exists, that is, whether the first LDN list and the second LDN list include at least one common local network identifier; and if an intersection set exists, determining, from the intersection set, a local network identifier as the target local network identifier. Further, if the intersection set has only one local network identifier, the local network identifier is used as the target local network identifier. Alternatively, if the intersection set has two or more local network identifiers, the target local network identifier is manually or automatically selected according to a local policy.

The implementation of this aspect exerts such control that a session establishment request is initiated only to an LDN of a subscriber. For example, an LDN of an enterprise campus is open only to employees of an enterprise but is inaccessible to an outsider who enters the enterprise campus. This further avoids an increase in invalid signaling delivery processes that is caused when an access rejection is made after an outsider enters the campus.

With reference to the second implementation of the first aspect, in a fourth implementation of the first aspect, a process of obtaining, by the terminal, the second LDN list from the network side includes: sending, by the terminal, a registration request message to the network side; and receiving, by the terminal, a registration response message fed back by the network side, where the registration response message includes the second LDN list. In this implementation, the network side adds the second LDN list to the registration response message, such that the terminal obtains at least one user-subscribed local network identifier in a registration process. This avoids a process in which the network side separately sends the second LDN list, thereby reducing signaling exchange overheads.

According to a second aspect, this application further provides an apparatus for establishing a local network connection. The apparatus may be configured in a terminal, and the terminal includes units or modules configured to perform the steps of the method according to the first aspect and the implementations of the first aspect.

According to a third aspect, this application further provides a network device, such as a base station or a radio access network (RAN). The network device includes an obtaining unit and a sending unit. Further, the obtaining unit is configured to obtain a first LDN list that is supported by a location area in which the network device is located, where the location area is a local network coverage area in which the network device is located, and the first LDN list includes at least one local network identifier. The sending unit is configured to send the first LDN list by adding the first LDN list to broadcast information, such that a terminal receives the first LDN list and establishes a session connection based on the first LDN list.

With reference to the third aspect, in a first implementation of the third aspect, the obtaining unit may be configured to configure the first LDN list through operation, administration, and maintenance (OAM), or obtain the first LDN list through signaling exchange with a network side. In addition, the first LDN list may be obtained in another manner, and this is not limited in this application.

According to a fourth aspect, this application further provides a terminal. The terminal includes components such as a transceiver, a processor, and a memory. The processor can execute a program or an instruction that is stored in the memory, to implement the method for establishing a local network connection according to the implementations of the first aspect.

In addition, this application further provides a network device. The network device includes components such as a transceiver, a processor, and a memory. Further, the processor is configured to execute a program or an instruction that is stored in the memory, to broadcast, to a terminal, broadcast information that carries a first LDN list.

According to a fifth aspect, this application further provides a communication method. The method includes: obtaining, by a control plane node, first information, where the first information includes local network access indication information or local network identification information; determining local network information available to user equipment UE; and sending the local network information to the UE.

With reference to the fifth aspect, in an implementation of the fifth aspect, the method further includes: obtaining, by the control plane node, location area information of the UE. Additionally, determining, by the control plane node, local network information available to UE based on the first information includes: determining, by the control plane node, the local network information available to the UE based on local network information obtained by the control plane node, the local network access indication information, and the location area information of the UE.

The obtained local network information includes: local network information generated through configuration by the control plane node, or local network information obtained from another device and stored in the control plane node.

With reference to the fifth aspect, in another implementation of the fifth aspect, when the local network access indication information indicates that the UE is allowed to access a local network, determining, by the control plane node, the local network information available to the UE based on the obtained local network information, the local network access indication information, and the location area information of the UE includes: obtaining, by the control plane node, local network information corresponding to the location area information of the UE from configured local network information or from a first network element, and using the local network information as the local network information available to the UE.

With reference to the fifth aspect, in still another implementation of the fifth aspect, the method further includes: obtaining, by the control plane node, location area information of the UE. Additionally, determining, by the control plane node, local network information available to user equipment UE based on the first information includes: determining, by the control plane node, the local network information available to the UE based on local network information obtained by the control plane node, the local network identification information, and the location area information of the UE.

With reference to the fifth aspect, in yet another implementation of the fifth aspect, determining, by the control plane node, the local network information available to the UE based on the obtained local network information, the local network identification information, and the location area information of the UE includes: obtaining, by the control plane node based on the local network identification information, local network service coverage information corresponding to the identifier; and when determining that the obtained local network information includes the local network identification information and the service coverage information corresponding to the local network identification information includes the location area information of the UE, determining, by the control plane node, that the local network information available to the UE is the local network service coverage information; or determining, by the control plane node from the obtained local network information, corresponding first local network identification information based on the location area information of the UE; and when the first local network identification information includes the local network identification information, determining that the local network information available to the UE is the local network service coverage information.

With reference to the fifth aspect, in still yet another implementation of the fifth aspect, obtaining local network information corresponding to the location area identifier of the UE from configured local network information includes: searching the configured local network information, to determine whether the local network information corresponding to the location area identifier of the UE exists; and if the local network information corresponding to the location area identifier of the UE exists, using the corresponding local network information as the local network information available to the UE; or if the local network information corresponding to the location area identifier of the UE does not exist, searching the configured local network information for the corresponding local network information using a location area identifier that is adjacent to the location area identifier of the UE as a search object.

With reference to the fifth aspect, in a further implementation of the fifth aspect, obtaining local network information corresponding to the location area identifier of the UE from another network element includes: sending, by the control plane node, the location area identifier of the UE to the another network element; and receiving local network information that is fed back by the another network element and that corresponds to the location area identifier of the UE, where the another network element includes a subscription data center, a home subscriber register, or a policy function network element.

With reference to the fifth aspect, in a still further implementation of the fifth aspect, the method further includes: if the access indication information indicates that the UE is forbidden to access a local network, sending an access failure feedback message to the UE.

According to a sixth aspect, this application further provides a communications apparatus, including: an obtaining unit configured to obtain first information, where the first information includes local network access indication information or local network identification information; a processing unit configured to determine local network information available to user equipment UE; and a sending unit configured to send the local network information to the UE.

With reference to the sixth aspect, in an implementation of the sixth aspect, the obtaining unit is further configured to obtain location area information of the UE; and the processing unit is configured to determine the local network information available to the UE based on local network information obtained by the communications apparatus, the local network access indication information, and the location area information of the UE.

With reference to the sixth aspect, in another implementation of the sixth aspect, the processing unit is configured such that when the local network access indication information indicates that the UE is allowed to access a local network, the processing unit obtains local network information corresponding to the location area information of the UE from configured local network information or from a first network element.

With reference to the sixth aspect, in still another implementation of the sixth aspect, the obtaining unit is further configured to obtain location area information of the UE; and the processing unit is configured to determine the local network information available to the UE based on obtained local network information, the local network identification information, and the location area information of the UE.

With reference to the sixth aspect, in yet another implementation of the sixth aspect, the processing unit is configured to: obtain, based on the local network identification information, local network service coverage information corresponding to the identifier; and when the obtained local network information includes the local network identification information and the service coverage information corresponding to the local network identification information includes the location area information of the UE, determine that the local network information available to the UE is the local network service coverage information. Alternatively, the processing unit is configured to: determine, from the obtained local network information, corresponding first local network identification information based on the location area information of the UE; and when the first local network identification information includes the local network identification information, determine that the local network information available to the UE is the local network service coverage information.

According to a seventh aspect, this application further provides a network device. The network device includes components such as a transceiver, a processor, and a memory. The memory stores an instruction. The processor is configured to execute the instruction in the memory to implement the communication method according to the fifth aspect in this application.

According to an eighth aspect, this application further provides a computer storage medium. The computer storage medium may store a program. When the program is executed, some or all of steps in the embodiments of the method for establishing a local network connection provided in this application can be implemented.

According to a ninth aspect, this application further provides a computer program product that includes an instruction. When the computer program product is run on a computer, the computer can perform the methods in the foregoing aspects.

BRIEF DESCRIPTION OF DRAWINGS

To describe the technical solutions in this application more clearly, the following briefly describes the accompanying drawings for describing the embodiments. A person of ordinary skill in the art may still derive other drawings—within the scope of the present disclosure—from these accompanying drawings without creative efforts.

DESCRIPTION OF EMBODIMENTS

To facilitate subsequent description and clearly describe this application, the following first briefly describes concepts that may be used in this application.

Figure 1:
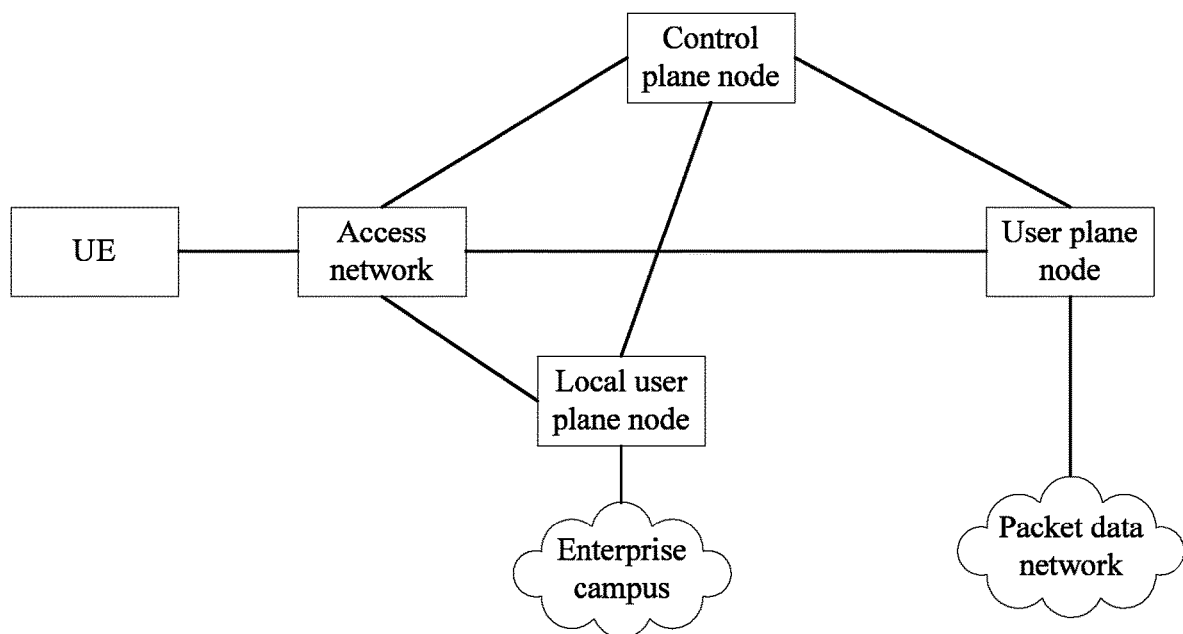
FIG. 1 is a schematic architectural diagram of deployment of a local network according to an embodiment of this application.

The methods provided in this application are applicable to various network systems. A new-generation mobile communications technology (for example, $5^{th}$ Generation (5G)) is used as an example. FIG. 1 is a schematic architectural diagram of deployment of a local network according to an embodiment of this application. The local network is a network that covers a particular local area, for example, a network that covers an enterprise campus, a campus, an airport, a railway station, a gymnasium, a large-scale shopping center, or the like. Further, a coverage area of the local network may be a tracking area (TA) list or a cell list. One TA list includes a plurality of tracking area identities (TAIs), and one TA includes a plurality of cells. Therefore, generally a TA list is relatively large, and usually includes more than one hundred cells. However, one local network generally has a relatively small coverage area, and usually covers only several cells.

A network architecture shown in FIG. 1 includes: an access network (AN), a control plane (CP) node, a user plane (UP) node, a local user plane node, an enterprise campus network, and a packet data network. In the embodiments of this application, at least one terminal such as a UE may communicate with one or more core networks through an access network or a radio access network (RAN).

The terminal may be a mobile terminal, such as a mobile phone (or referred to as a "cellular" phone) or a computer equipped with a mobile terminal. For example, the terminal may be a portable, pocket-sized, handheld, computer built-in, or in-vehicle mobile apparatus that exchanges voice and/or data with the radio access network. For example, the terminal may be a device, such as a personal communications service (PCS) phone, a cordless telephone set, a Session Initiation Protocol (SIP) phone, a wireless local loop (WLL) station, or a personal digital assistant (PDA). The terminal may also be referred to as a subscriber unit (SU), a subscriber station (SS), a mobile station (MS), a remote station (RS), an access point (AP), a remote terminal (RT), an access terminal (AT), a user terminal (UT), a user agent (UA), or user equipment (UE).

The access network or the radio access network may be a base station such as a NodeB, an enhanced base station, a repeater having a scheduling function, a device having a base station function, or the like. The base station may be an evolved NodeB (eNB) in a network system, or may be a base station in another system, and this is not limited in the embodiments of this application.

The technical solutions provided in this application are mainly about how a terminal learns a local network supported by a current location of the terminal, to resolve a problem that UE performs a large amount of computation and occupies many resources when sensing a local network coverage area.

Because a local network coverage area may be several TAs or several cells, in terms of planning, a base station side may learn whether a current cell supports a local network and learn local networks whose services are supported by the current cell. Therefore, an identifier of a supported local network may be carried in a radio broadcast channel of the cell. During cell reselection, a user can obtain the identifier of the supported local network from the broadcast channel and establish a network session connection. The following describes a method for establishing a local network connection provided in this application.

Embodiment 1

Figure 2:
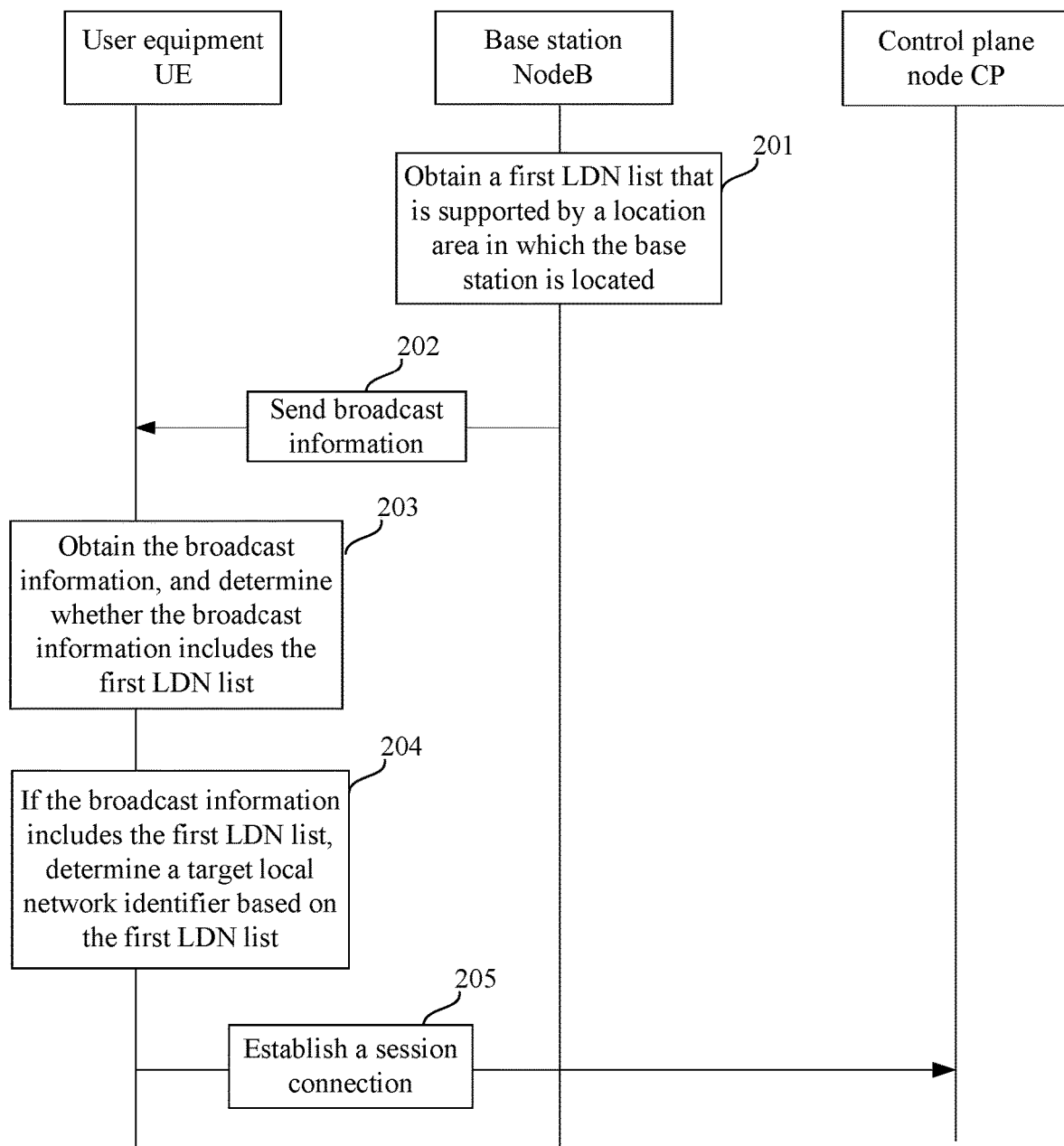
FIG. 2 is a signaling flowchart of a method for establishing a local network connection according to an embodiment of this application.

FIG. 2 is a signaling flowchart of a method for establishing a local network connection according to this embodiment. Steps of the method are described using a UE, a base station, and a network device such as a control plane node as an example. The method includes the following steps.

Step 201: A base station obtains a first local data network (LDN) list that is supported by a location area in which the base station is located, where the location area is a local network coverage area in which the base station is located, and the LDN list includes at least one local network identifier.

The local network identifier may also be referred to as a data network name (DNN), and indicates a locally deployed network. The local network identifier is so termed as to differentiate the locally deployed network from a common network, and is similar to an access point name (APN) in a 4G network.

When a base station is within a local network coverage area, the base station obtains a first LDN list that is supported by a location area in which the base station is located. The first LDN list includes one or more local network identifiers. A manner in which the base station obtains the first LDN list may be as follows. The base station generates the first LDN list through configuration in an operation, administration, and maintenance (OAM) manner, or the base station obtains the first LDN list through signaling exchange with a control plane node in a core network. Further, if the base station obtains the first LDN list through signaling exchange, the base station needs to send a request message to the control plane node. After receiving the request message, the control plane node delivers a response message to the base station. The response message includes at least one local network identifier of the area in which the base station is located. In addition, alternatively, the base station may obtain the first LDN list in another manner, and this is not limited in this application.

In addition, the method further includes a step in which UE registers with a network using the base station. A process of the registration is consistent with an existing UE registration process, and therefore reference can be made to the existing UE registration process. The network in this embodiment may be a control plane node, or may be another network device such as a mobility management entity (MME).

Step 202: The base station sends broadcast information in a broadcast manner, where the broadcast information may or may not carry the first LDN list. For example, when the location area in which the base station is located is not within a local network coverage area, the broadcast information does not include the first LDN list. In other words, whether the broadcast information to be sent by the base station includes the LDN list may be determined depending on whether the base station is within a local network coverage area.

Step 203: UE obtains the broadcast information sent by the base station, and determines whether the broadcast information includes the first LDN list or includes a local network identifier.

Step 204: If the broadcast information includes the first LDN list, the UE may determine a target local network identifier based on the first LDN list.

In some Implementations, determining, by the UE, a target local network identifier based on the first LDN list includes: selecting, by the UE, a local network identifier from the first LDN list according to a local policy, and using the selected local network identifier as the target local network identifier. The local policy is locally configured, and may include a priority policy for locally configuring LDNs, and the like. An implementation in which the UE selects the target local network identifier comprises: automatically or manually selecting a local network identifier with a highest priority as the target local network identifier in descending order of priorities for locally configuring LDNs. Alternatively, a DNN may be manually selected as the target local network identifier according to a current requirement of a user, and this is not limited in this embodiment.

If the broadcast information received by the UE does not include the first LDN list or a local network identifier, the UE does not trigger subsequent steps of the method.

Optionally, step 203 further includes storing, by the UE, the at least one local network identifier in the first LDN list.

Step 205: The UE establishes a session connection using the target local network identifier.

In some implementations, the UE establishes a session connection to a local network using the base station and the control plane node, and then the control plane node enables, by controlling a local user plane node, the UE to access the local network. A process in which the UE establishes a session connection to a network side is the same as an existing session establishment process. Details are not described.

In the method provided in this embodiment, the base station broadcasts, using a radio broadcast channel, local network identifiers that are supported by the location area in which the base station is currently located, such that the UE can determine, based on the local network identifiers obtained at a current location, the target local network identifier for establishing a session connection, and quickly establish the session connection. This avoids storing a large amount of related information of local network coverage areas in the UE, saves a storage resource of the UE, and also reduces processing complexity of the UE when the UE determines a local network coverage area, thereby improving local network connection efficiency.

Embodiment 2

Figure 3:
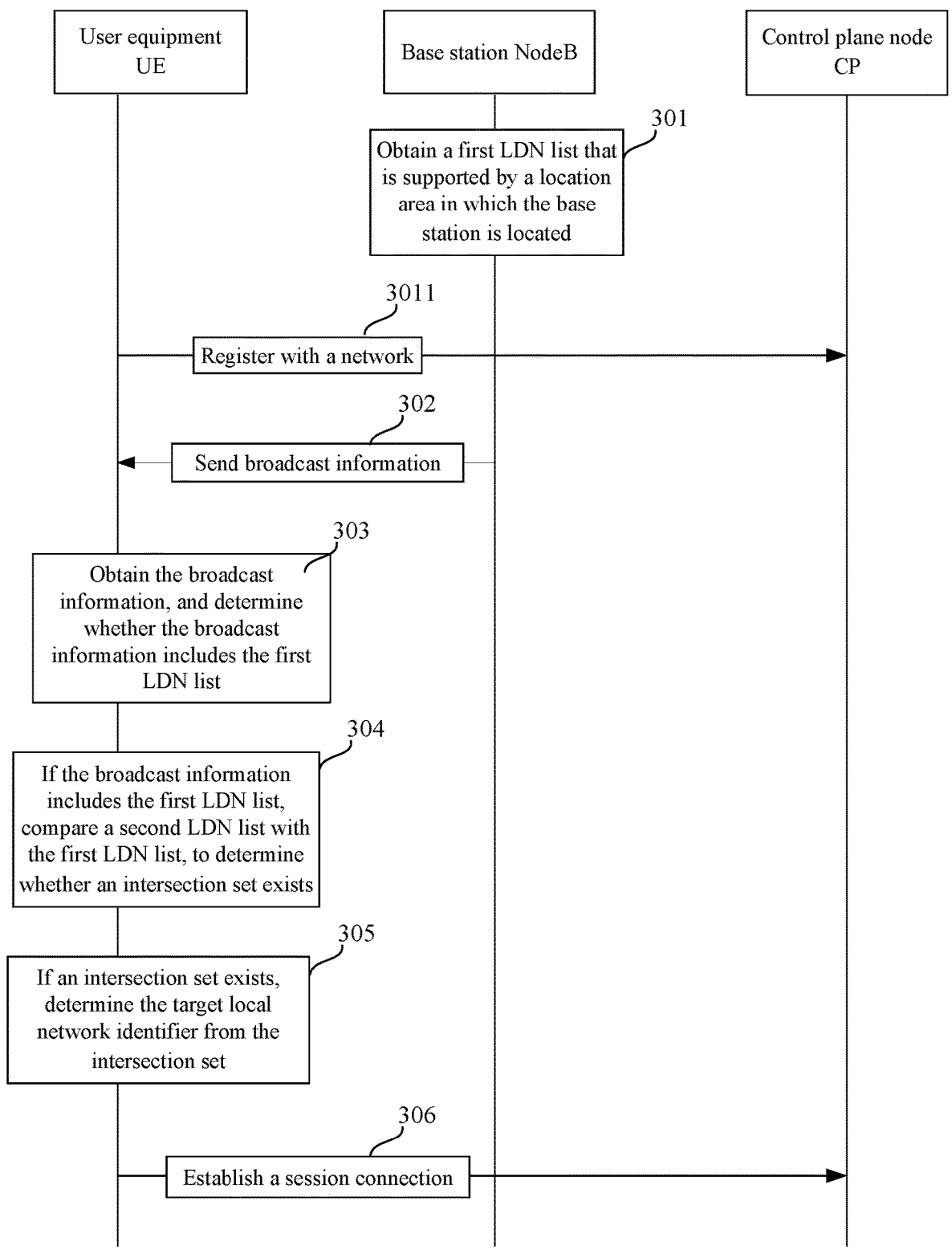
FIG. 3 is a signaling flowchart of another method for establishing a local network connection according to an embodiment of this application.

As shown in FIG. 3, a method provided in this embodiment includes the following steps.

Step 301 and step 302 are the same as step 201 and step 202 in Embodiment 1. For details, refer to the process descriptions in Embodiment 1. The details are not described again.

The method further includes step 3011, in which UE registers with a network, between step 301 and step 302.

Step 3011 includes: sending, by the UE, a registration request message to a control plane node on a network side, where the registration request message may be sent in an initial registration process or in a location update re-registration process. The initial registration process means first registration upon power-on of a terminal. The location update re-registration process means a registration process other than the initial registration process, for example, includes a process of re-registration upon expiry of a registration timer, or a process of re-registration due to a UE location change.

The control plane node generates a registration response message based on the registration request message, and delivers the registration response message to the UE. The registration response message includes a second LDN list. The second LDN list includes all user-subscribed local network identifiers, or includes a subscribed local network identifier that is based on a location area (a TAI list) in which the UE is located.

Optionally, the control plane node on the network side may obtain, from a united data management (UDM) library, the user-subscribed second LDN list, or may obtain the second LDN list in another manner, and this is not limited in this embodiment.

Optionally, the UE stores the user-subscribed second LDN list.

Step 303: The UE obtains the broadcast information from a radio broadcast channel of the base station, and determines whether the broadcast information includes the first LDN list.

Step 304: If the first LDN list is included, compare a second LDN list in a registration response message with the first LDN list in the broadcast information, to determine whether an intersection set exists, where the intersection set includes at least one same local network identifier.

Step 305: If an intersection set exists, determine, from the intersection set, a local network identifier as a target local network identifier. For example, the UE manually or automatically selects a local network identifier from the intersection set as the target network identifier according to a local policy.

Step 306: The UE establishes a session connection using the target local network identifier. A process of establishing the session connection is the same as step 205 in Embodiment 1.

It should be noted that, in this embodiment, if the broadcast information delivered by the base station includes the first LDN list, and all local network identifiers in the first LDN list are different from the user-subscribed local network identifiers, in other words, no intersection set exists between the first LDN list and the second LDN list, the UE cannot initiate a session connection to a local network identifier corresponding to the first LDN list.

In the method provided in this embodiment, the network side delivers, using the registration response message, the user-subscribed LDN list to the UE, such that the UE can compare the subscribed LDN list with the LDN list carried in the broadcast information, and select a local network identifier from an intersection set of local network identifiers to initiate a session connection. The session connection is established only to a user-subscribed local network. In this way, it can be controlled to initiate a session establishment request only to an LDN of a subscriber. For example, an LDN of an enterprise campus is open only to employees of an enterprise but is inaccessible to an outsider who enters the enterprise campus. If obtaining an intersection set based on user-subscribed LDNs is not performed, a session connection is initiated each time an outsider enters the enterprise campus and finally a network side makes an access rejection, causing an increase in invalid signaling delivery processes.

With respect to the foregoing method embodiments, this application further provides embodiments for corresponding apparatuses such as a terminal and a network device.

Figure 4:
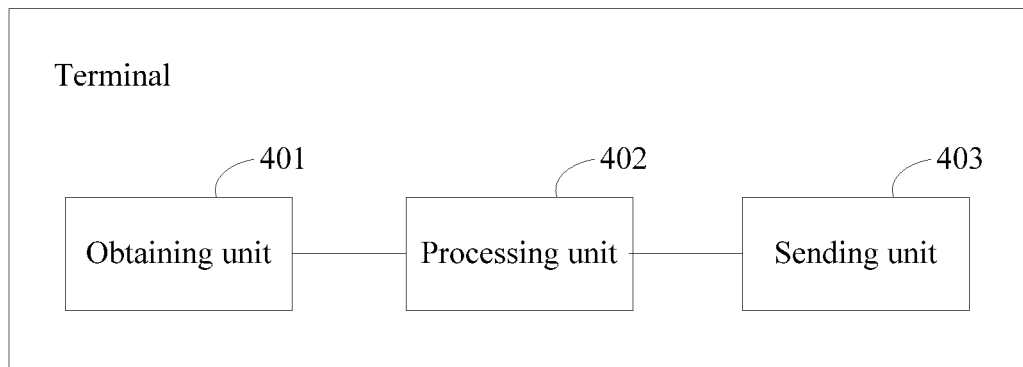
FIG. 4 is a schematic structural diagram of a terminal according to an embodiment of this application.

FIG. 4 is a schematic structural diagram of a terminal according to an embodiment of this application. The terminal may be the UE in the foregoing embodiments or may be disposed in another terminal, and is configured to perform the local network connection method corresponding to FIG. 2 or FIG. 3.

As shown in FIG. 4, the terminal includes an obtaining unit 401, a processing unit 402, and a sending unit 403.

The obtaining unit 401 is configured to obtain broadcast information that is sent by a base station, where the broadcast information may carry a first LDN list, or may not carry a first LDN list.

The processing unit 402 is configured to: if it is detected that the broadcast information includes the first LDN list, determine a target local network identifier based on the first LDN list, where the first LDN list includes at least one local network identifier; and establish, using the target local network identifier, a session connection to a local network corresponding to the target local network identifier.

Optionally, in an implementation of this embodiment of this application, the processing unit 402 is configured to select a local network identifier from the first LDN list according to a local policy, and use the selected local network identifier as the target local network identifier.

Optionally, in another implementation of this embodiment of this application, the obtaining unit 401 is further configured to obtain a second LDN list from a network side, where the second LDN list includes at least one user-subscribed local network identifier.

Correspondingly, the processing unit 402 is configured to determine the target local network identifier based on the first LDN list and the second LDN list.

Optionally, in still another implementation of this embodiment of this application, the processing unit 402 is configured to determine the target local network identifier based on the first LDN list and the second LDN list. To this end, the processing unit 402 is configured to: compare the first LDN list with the second LDN list, to determine whether an intersection set exists; and if an intersection set exists, determine, from the intersection set, a local network identifier as the target local network identifier.

Optionally, in yet another implementation of this embodiment of this application, the sending unit 403 is configured to send a registration request message to the network side. Correspondingly, the obtaining unit 401 is configured to receive a registration response message fed back by the network side, where the registration response message includes the second LDN list.

Optionally, in still yet another implementation of this embodiment of this application, the terminal may further include a storage unit configured to store information such as the first LDN list and the second LDN list.

Corresponding to the terminal provided in this embodiment, this embodiment further provides a network device. The network device may be the base station in the foregoing embodiments, or may be another network device such as an RAN, and is configured to perform the local network connection method corresponding to FIG. 2 or FIG. 3.

Figure 5:
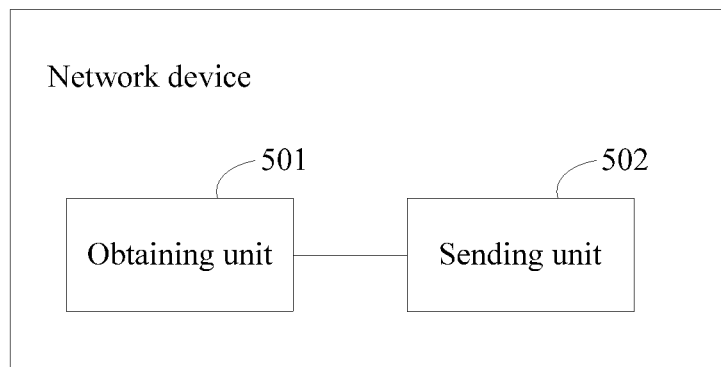
FIG. 5 is a schematic structural diagram of a network device according to an embodiment of this application.

FIG. 5 is a schematic structural diagram of the network device. The network device includes an obtaining unit 501 and a sending unit 502, and may further include a processing unit, a storage unit, and the like.

The obtaining unit 501 is configured to obtain a first LDN list that is supported by a location area in which the network device is located, where the location area is a local network coverage area in which the device is located, and the first LDN list includes at least one local network identifier. The sending unit 502 is configured to send the first LDN list by adding the first LDN list to broadcast information.

Optionally, in an implementation of this embodiment of this application, the obtaining unit 501 is configured to configure the first LDN list through OAM, or obtain the first LDN list through signaling exchange with a network side. Alternatively, the first LDN list may be generated through processor configuration. This is not limited in this embodiment.

For the terminal and the network device provided in the embodiments, in a process of establishing a local network connection in the foregoing method embodiments, the network device broadcasts, using a radio broadcast channel, local network identifiers supported by the location area in which the network device is located, such that the terminal UE at a receive end can determine, based on the local network identifiers obtained at a current location, the target local network identifier for establishing a session connection, and quickly establish the session connection. This avoids storing a large amount of related information of local network coverage areas in the UE, saves a storage resource of the UE, and also reduces processing complexity of the UE when the UE determines a local network coverage area, thereby improving local network connection efficiency.

In a practical hardware layer, an embodiment of this application further provides a local network connection system. The system includes at least one terminal, a base station, at least one local network, and the like.

Figure 6:
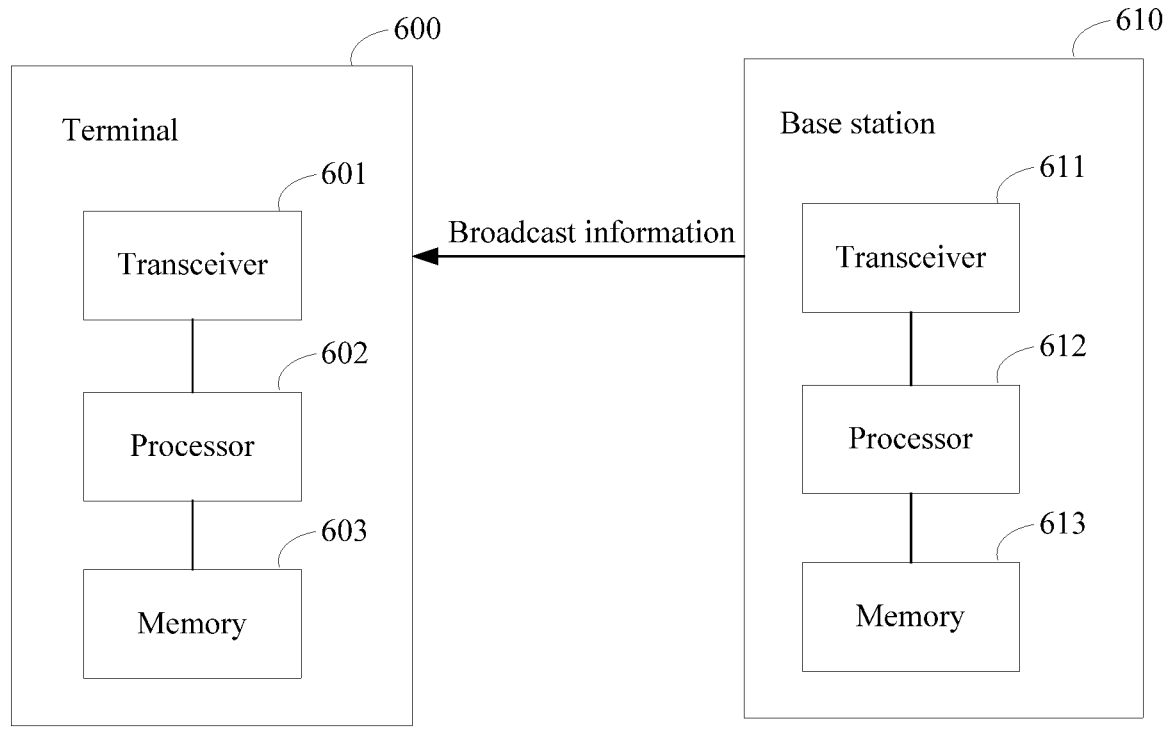
FIG. 6 is a schematic structural diagram of a local network connection system according to an embodiment of this application.

As shown in FIG. 6, the terminal 600 may include a transceiver 601, a processor 602, a memory 603, and the like. Likewise, the base station 610 may also include a transceiver 611, a processor 612, a memory 613, and the like.

Further, in an implementation, the transceiver 611 is configured to: obtain a first LDN list that is supported by a location area in which the base station is located, where the location area is a local network coverage area in which the base station is located, and the first LDN list includes at least one local network identifier; and send, using the transceiver 611, the first LDN list to the terminal by adding the first LDN list to broadcast information.

The transceiver 601 of the terminal is configured to receive the broadcast information that is sent by the base station. The processor 602 is configured to: determine a target local network identifier based on the first LDN list in the broadcast information; and establish, using the target local network identifier, a session connection to a local network corresponding to the target local network identifier.

Optionally, in an implementation, the processor 602 of the terminal is configured to: select a local network identifier from the first LDN list according to a local policy; and use the selected local network identifier as the target local network identifier.

Optionally, in an implementation, the transceiver 601 of the terminal is further configured to send a registration request message to a control plane node on a network side. The control plane node is configured to: receive the registration request message, generate a registration response message; and send a second LDN list to the terminal, where the registration response message includes the second LDN list, and the second LDN list includes at least one user-subscribed local network identifier corresponding to the terminal.

The transceiver 601 of the terminal is configured to obtain the second LDN list and determine the target local network identifier based on the first LDN list and the second LDN list.

Optionally, in an implementation, the transceiver 601 of the terminal is further configured to: compare the first LDN list with the second LDN list, to determine whether an intersection set exists; and if an intersection set exists, determine, from the intersection set, a local network identifier as the target local network identifier.

In the terminal described in this embodiment, the processor 602 is a control center of the terminal. The processor 602 is connected to all parts of the entire terminal using various interfaces and lines, and executes various functions of the terminal and/or processes data by running or executing a software program and/or a software module that are stored in the memory and invoking data stored in the memory.

The processor 602 may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 603 may include a volatile memory such as a random access memory (RAM), or may include a non-volatile memory such as a flash memory, a hard disk drive (HDD), or a solid-state drive (SSD). Alternatively, the memory may include a combination of the foregoing types of memories.

The transceiver 601 may include components such as a receiver, a transmitter, and an antenna, and is configured to receive or send data. The transceiver 601 may be controlled by the processor 602 to: receive the broadcast information, initiate a session connection based on the determined target local network identifier, and communicate with another node or device in the network system, for example, in a process of registration with a network.

Further, the transceiver 601 may include a communications module, such as a wireless local area network (WLAN) module, a Bluetooth module, or a baseband module. The transceiver 601 may also include a radio frequency (RF) circuit corresponding to the communications module to perform wireless local area network communication, Bluetooth communication, infrared communication, and/or cellular communications system communication, for example, Wideband Code Division Multiple Access (WCDMA) and/or High Speed Downlink Packet Access (HSDPA). The transceiver is configured to control communication between the components in the terminal, and can support direct memory access.

In this embodiment of this application, functions to be implemented by the obtaining unit 401 and the sending unit 403 may be implemented by the transceiver 601 of the terminal, and functions to be implemented by the processing unit 402 may be implemented by the processor 602 of the terminal. Likewise, functions to be implemented by the obtaining unit 501 and the sending unit 502 of the network device may be implemented by the transceiver 611 of the base station, or implemented by the transceiver 611 under the control of the processor 612.

The terminal 600 and the base station 610 that are described in this embodiment are further configured to implement all method processes shown in FIG. 2 or FIG. 3 in the foregoing embodiments.

During implementation, this application further provides a computer storage medium. The computer storage medium may store a program. When the program is executed, some or all of steps in the disclosed embodiments for establishing a local network connection provided in this application can be implemented. The storage medium may be a magnetic disk, an optical disc, a read-only memory (ROM), a random access memory (RAM), or the like.

In addition, an embodiment of this application further provides a computer program product that includes an instruction. When the computer program product is run on a computer, the computer can perform some or all of disclosed steps for establishing a local network connection described in the foregoing embodiments.

Figure 7:
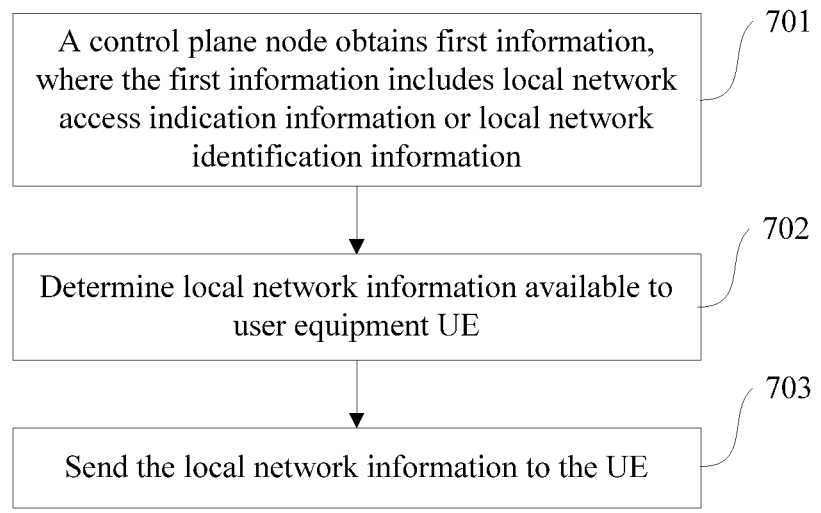
FIG. 7 is a flowchart of a communication method according to an embodiment of this application.

In addition, this application further provides a method for sending local network information. As shown in FIG. 7, the method includes the following steps.

Step 701: A control plane node obtains first information, where the first information includes local network access indication information or local network identification information.

The local network access indication information is used to indicate whether requester UE is allowed to access a local network, or is used to indicate whether requester UE wants to obtain a local network service. The local network identification information is used to determine a unique local network.

The first information may come from a user equipment, such as a terminal device. The control plane node may further obtain location information of the user equipment, for example, information about a base station accessed by the user equipment. The base station is a base station corresponding to a location area in which the UE that initiates a request is currently located.

In addition, the base station may divide a geographical range served by the base station into different location areas, and set a corresponding location area identifier for each location area. The location area identifier is used to uniquely indicate the location area. In some implementations, the location area identifier may be a name of the location area, a number of the location area, or the like, and this is not limited in this embodiment of the present disclosure. In the present disclosure, a location area may be a TA area accessed by the UE, a cell area accessed by the UE, or the like.

Step 702: The control plane node determines local network information available to user equipment UE.

Step 702 may include the following two solutions.

Solution 1: The control plane node determines the local network information available to the UE based on the local network access indication information in the first information.

Solution 2: The control plane node determines the local network information available to the UE based on the local network identification information in the first information.

Step 703: The control plane node sends the local network information to the UE.

The following describes in detail Solution 1 and Solution 2 provided in this embodiment of this application.

Solution 1

Figure 8:
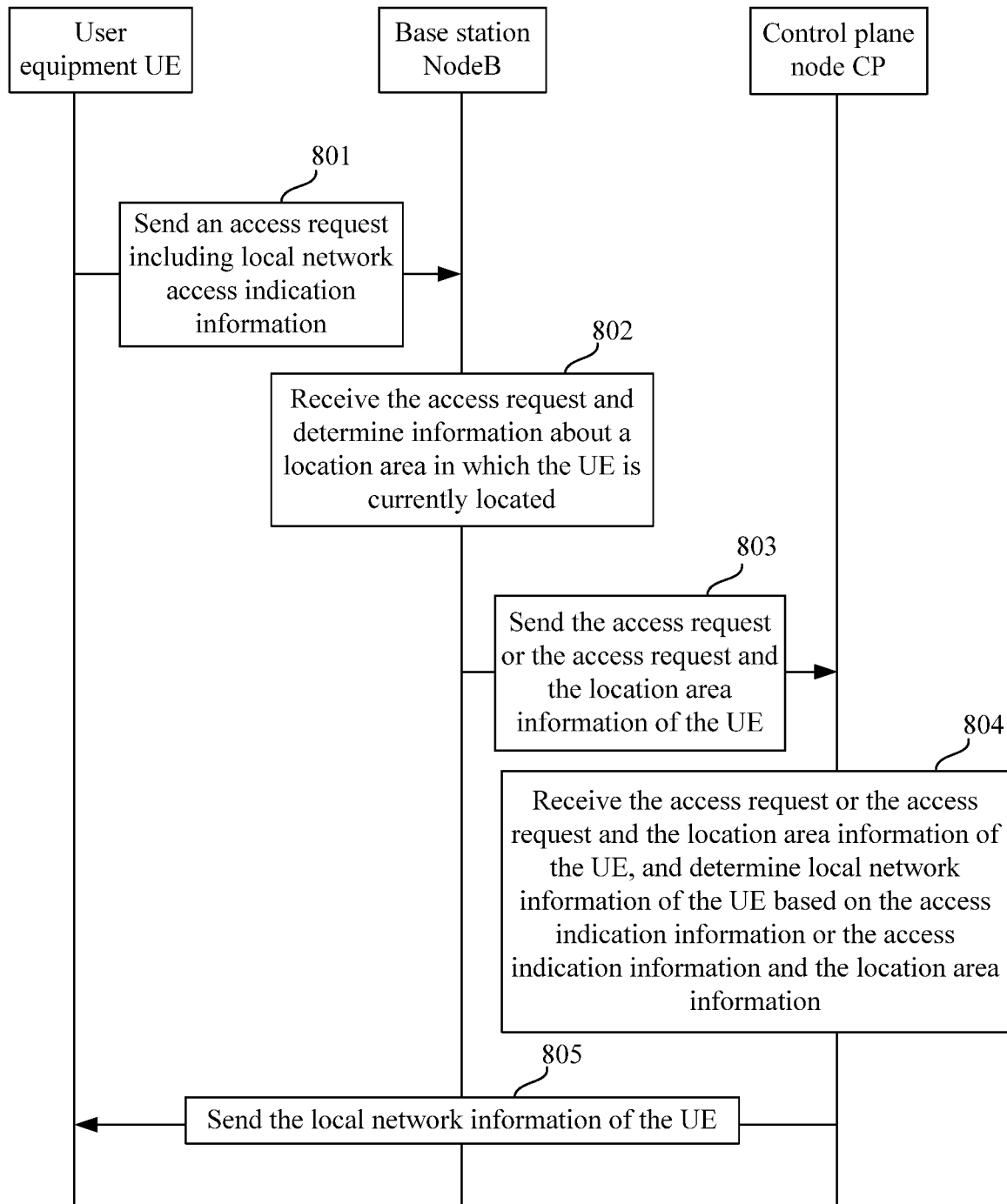
FIG. 8 is a signaling flowchart of a communication method according to an embodiment of this application.

As shown in FIG. 8, the solution includes the following steps.

Step 801: UE sends an access request to a control plane node using a base station, where the access request includes local network access indication information.

The base station is a base station corresponding to a location area in which the UE is currently located. The access request includes an attach request, a location update request (for example, a tracking area update (TAU) request), a registration request, or the like. The registration request includes a registration request due to initial registration, or a registration request due to mobility registration update (that is, a location area has changed).

The access indication information is used to indicate whether the UE is allowed to access a local network, or is used to indicate whether the requester UE wants to obtain a local network service. For example, the following various forms may be used for the indication.

In a possible manner, the access indication information carries a first indication symbol or field, used to indicate that the UE is allowed to access a local network. For example, the first indication symbol or field is "1". If the access indication information carries the indication symbol "1", it indicates that the UE is allowed to access a local network.

In another possible manner, the access indication information may further carry a second indication symbol or field, used to indicate that the UE is disallowed/forbidden to access a local network. For example, the second indication symbol or field is "0". If the access indication information carries the indication symbol "0", it indicates that the UE is disallowed to access a local network.

Alternatively, whether the UE is allowed to access a local network is indicated by whether the access indication information carries a particular indication symbol or field. For example, if the access indication information carries a first indication field, it indicates that the UE is allowed to access a local network. Alternatively, if the access indication information does not carry a first indication field, it indicates that the UE is disallowed to access a local network.

It may be understood that the local network access indication information may indicate a desire of a user. During practical application, an "agree" option and/or a "reject" option may be set in the UE, to indicate whether the user agrees that the user equipment used by the user is to access a local network. When an operation of triggering the "agree" option is detected, local network access indication information that indicates that the UE is allowed to access a local network may be added to the access request. When an operation of triggering the "reject" option is detected, local network access indication information that indicates that the UE is disallowed to access a local network may be added to the access request.

In addition, another symbol, another field, or other information may be set in the access indication information, to indicate whether the UE is allowed to access a local network, and this is not limited in this embodiment.

Step 802: The base station receives the access request sent by the UE, and determines information about a location area in which the UE is currently located.

The location area information may be a location area identifier.

Optionally, the base station may divide a geographical range served by the base station into different location areas, and set a corresponding location area identifier for each location area. The location area identifier is used to uniquely indicate the location area. In some implementations, the location area identifier may be a name of the location area, a number of the location area, or the like. In addition, the location area may be a TA area accessed by the UE, a cell area accessed by the UE, or the like, and this is not limited in this embodiment of this application.

Step 803: The base station sends the access request or the access request and the location area information of the UE to the control plane node.

Optionally, the access request and the current location area information of the UE may be sent to the control plane node using one message. Alternatively, the access request and the current location area information may be respectively carried in two messages, for example, first information and second information, and sent to the control plane node. The first information includes the local network access indication information, and the second information includes the location area information of the UE.

Step 804: The control plane node receives the access request sent by the base station, or receives the access request and the location area information of the UE. Additionally, the control plane node determines, based on the access request from the base station or the access request and the location area information of the UE, local network information that needs to be sent to the UE (i.e., local network information available to the UE). The local network information available to the UE is uniformly used in the following description, and this is not described again.

The control plane node is an access and mobility management entity, such as an Access and Mobility Management function (AMF) in a 5G network or an MME in a $4^{th}$ Generation (4G) network, or may be a session management entity, such as a Session Management Function (SMF) in 5G.

Optionally, the access request includes first information, and the first information includes the local network access indication information.

Correspondingly, the control plane node determines the local network information available to the UE based on the local network access indication information, or based on the local network access indication information, the location area information of the UE, and local network information obtained by the control plane node. The local network information includes a local network identifier and corresponding service coverage information.

The local network information obtained by the control plane node includes: local network information stored in the control plane node; or local network information generated through configuration by the control plane node; or local network information obtained by the control plane node from another device.

In an implementation, the control plane node determines the local network information available to the UE based on the local network access indication information.

This includes: determining, by the control plane node, the local network information available to the UE based on the local network information obtained by the control plane node. Alternatively, this includes: obtaining, by the control plane node, local network information from a configured database; and determining, from the obtained local network information, the local network information that needs to be sent to the UE.

The local network information includes local network identification information and corresponding service coverage information. The local network identification information may be a name of a local network, and the service coverage information may be one or more location area identifiers.

For example, when the access request received by the control plane node carries the local network access indication information and the local network access indication information indicates that the UE is allowed to access a local network, the local network information available to the UE is determined.

In another implementation, the control plane node determines the local network information available to the UE based on the obtained local network information, the local network access indication information, and an identifier of the location area in which the UE is currently located.

This includes: when the local network access indication information indicates that the UE is allowed to access a local network, obtaining, by the control plane node from the stored local network information, local network information corresponding to the location area identifier of the UE.

Optionally, if the corresponding local network information is obtained, the local network information corresponding to the location area identifier is determined as the local network information that needs to be sent to the UE. Alternatively, if no related local network information is found, a feedback message is sent to the UE, where the feedback message includes content indicating that the request of the UE fails or indicating a failure cause.

Optionally, an identifier adjacent to the location area identifier of the UE is selected as a search object, to search the local network information for local network information corresponding to the adjacent identifier. If the corresponding local network information is found, the corresponding local network information is used as the local network information available to the UE.

The local network information corresponding to the location area identifier means that service coverage information corresponding to a specific local network includes the location area identifier.

Optionally, the control plane node may obtain the local network information corresponding to the location area identifier from locally stored or locally configured local network information. Alternatively, the control plane node may obtain local network information from another network element, and store the local network information. Alternatively, the control plane node may send the location area identifier to another network element, and obtain the local network information corresponding to the location area identifier from local network information that is stored in the other network element. This is not limited in this embodiment.

The other network element may be a subscription data center, a home subscriber register, a policy function network element, or the like, and this is not limited in this embodiment of this application.

Step 805: The control plane node sends the local network information that is determined in step 804 to the UE.

In addition, the method further includes: if the local network access indication information received from the UE indicates that the UE is disallowed to access a local network, skipping, by the base station, sending local network information to the UE, or rejecting the access request of the UE and sending an access failure feedback message to the UE, where the feedback message includes failure indication information or a failure cause.

In the method provided in this embodiment, flexibility of a desire of the terminal user equipment is improved, such that the user equipment can autonomously choose to accept the local network information sent by the control plane node. In other words, when the user does not want to initiate a local network service, the control plane node does not send the local network information, thereby reducing signaling exchange and saving memory of the terminal device.

Solution 2

This embodiment provides a method for sending local network information. In the method, a control plane node determines local network information available to UE based on local network identification information and an identifier of a location area in which the UE is currently located.

Figure 9:
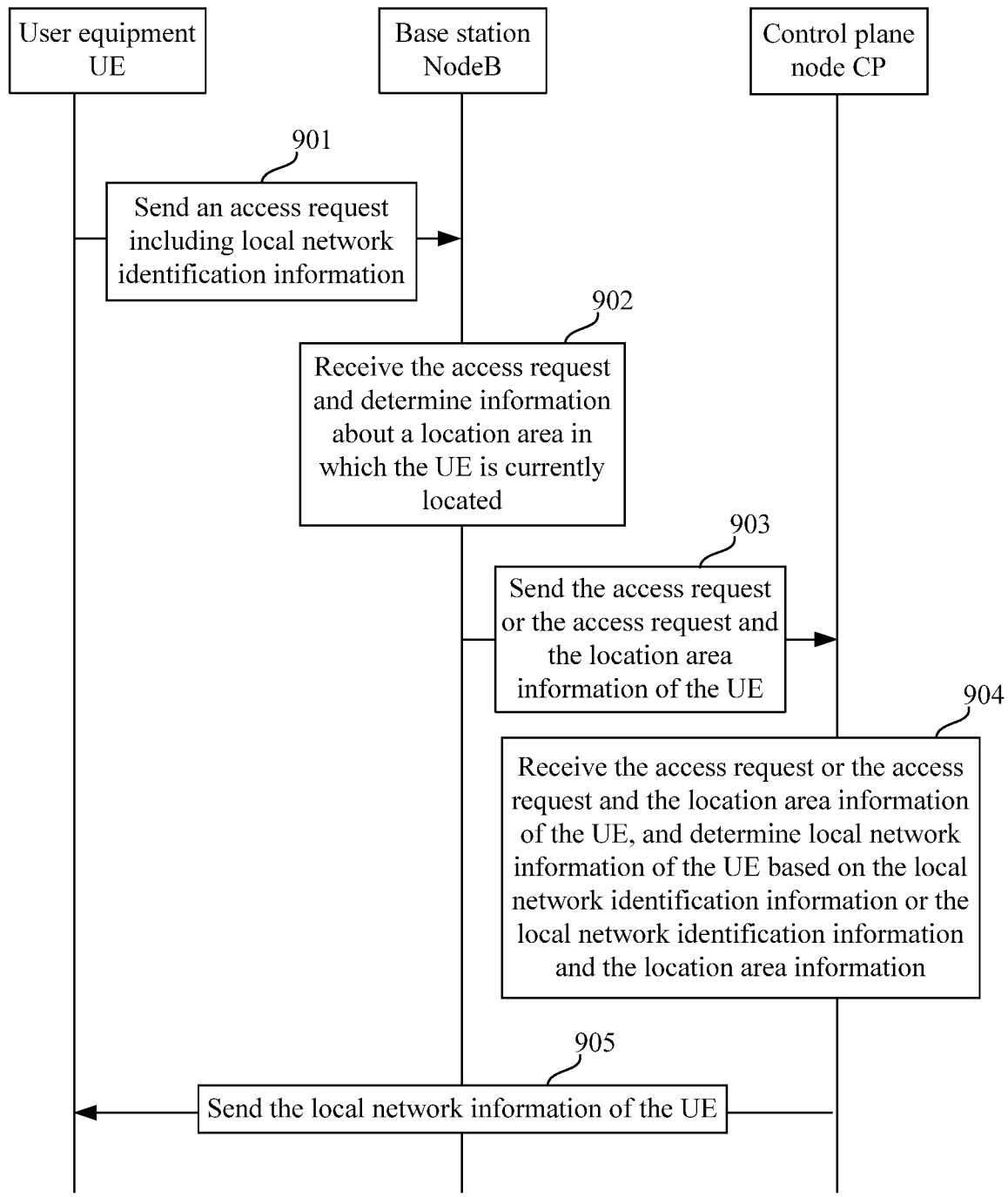
FIG. 9 is a signaling flowchart of another communication method according to an embodiment of this application.

As shown in FIG. 9, the method includes the following steps. Step 901: UE sends an access request to a control plane node using a base station, where the access request carries identification information of one or more local networks.

The local network identification information is used to uniquely identify a local network, for example, a name of the local network. In addition, the local network identification information may alternatively be used to indicate service coverage information that corresponds to a local network and that the UE expects to obtain, or indicate a local network that the UE expects to access subsequently.

Step 902: When receiving the access request sent by the user equipment, the base station determines an identifier of a location area in which the UE is currently located.

The identifier of the current location area of the UE is the same as the location area identifier in Solution 1. For details, refer to the descriptions in Solution 1. The details are not described again in this embodiment.

Step 903: The base station sends the access request or the access request and the identifier of the location area in which the UE is currently located to the control plane node.

Alternatively, the identification information of at least one local network in the access request may be carried using first information.

Step 904: The control plane node receives the access request and the identifier of the current location area of the UE that are sent by the base station, and determines local network information available to the UE based on the local network identification information carried in the access request, or determines local network information available to the UE based on local network information obtained by the control plane node, the local network identification information, and the identifier of the location area in which the UE is currently located. The local network information may include only local network service coverage information, or may include both a local network identifier and corresponding service coverage information.

In a first implementation, determining, by the control plane node, local network information available to the UE based on the local network identification information includes: searching, by the control plane node, stored local network information, to determine whether the service coverage information corresponding to the local network identifier is included; and if the service coverage information corresponding to the local network identifier is included, using the service coverage information corresponding to the local network identifier as the local network information available to the UE.

Optionally, in a second implementation, determining, by the control plane node, local network information available to the UE based on obtained local network information, the local network identification information, and the identifier of the location area in which the UE is currently located includes the following two manners.

Manner 1: The control plane node searches configured or stored local network information, to determine whether a local network corresponding to the local network identification information is included.

If the local network corresponding to the local network identification information is included, the control plane node further determines whether service coverage information corresponding to the local network includes the identifier of the location area in which the UE is currently located. If the service coverage information corresponding to the local network includes the identifier of the location area in which the UE is currently located, the control plane node determines the service coverage information corresponding to the local network as the local network information available to the UE. If the service coverage information corresponding to the local network does not include the identifier of the location area in which the UE is currently located, the control plane node determines that the local network information of the control plane node does not include local network information that is requested by the UE.

That the service coverage information corresponding to the local network does not include the identifier of the location area in which the UE is currently located may be understood to comprise: determining whether the local network information includes the local network corresponding to the local network identification information; and determining whether the service coverage information corresponding to the local network includes the identifier of the location area in which the UE is currently located, where at least one of the two conditions is not met.

Manner 2: The control plane node may search configured or stored local network information, to determine whether local network information corresponding to the location area identifier of the UE is included.

If the local network information corresponding to the location area identifier of the UE is included, the control plane node further determines whether the local network information corresponding to the location area identifier includes a local network corresponding to the local network identification information. If the local network information corresponding to the location area identifier includes the local network corresponding to the local network identification information, the local network information corresponding to the location area identifier of the UE is the local network information available to the UE.

If either of the foregoing two conditions is not met, the control plane node determines that the local network information of the control plane node does not include local network information requested by the UE.

In addition, the method further includes: when determining that no local network information is provided for the UE, sending, by the control plane node, an access failure feedback message to the UE, where the feedback message includes failure indication information or a failure cause.

In the method provided in this embodiment, flexibility of a desire of the terminal user equipment is improved, such that the user equipment can autonomously choose to accept the local network information sent by the control plane node. In other words, the user can separately request local network information of a specific local network or local network information of a plurality of local networks, and the control plane node sends only the local network information requested by the user, thereby reducing signaling exchange and saving memory of the terminal device.

Figure 10:
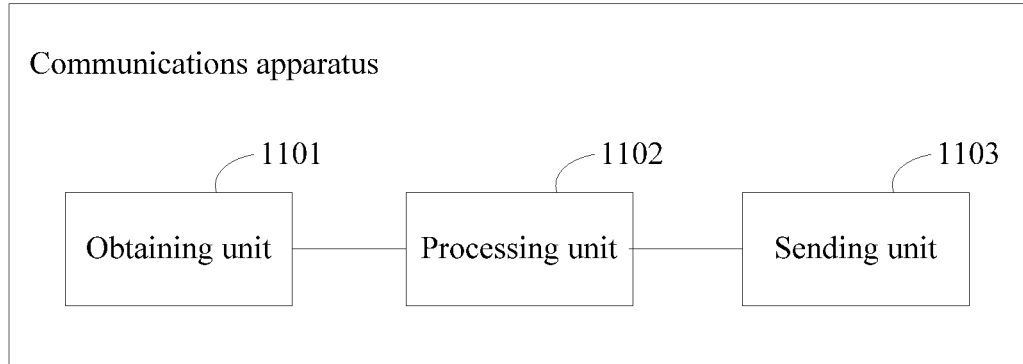
FIG. 10 is a schematic structural diagram of a communications apparatus according to an embodiment of this application.

Corresponding to the foregoing communication method, this application further provides a communications apparatus. The apparatus may be configured to perform the communication method described in FIG. 7 to FIG. 9 in the foregoing embodiment. As shown in FIG. 10, the apparatus includes an obtaining unit 1101, a processing unit 1102, and a sending unit 1103, and may further include another unit or module, such as a storage unit.

The obtaining unit 1101 is configured to obtain first information, where the first information includes local network access indication information or local network identification information. The processing unit 1102 is configured to determine local network information available to a UE, and the sending unit 1103 is configured to send the local network information to the UE.

Optionally, in an implementation, the obtaining unit 1101 is further configured to obtain location area information of the UE. Additionally, the processing unit 1102 is configured to determine, based on obtained local network information, the local network access indication information, and the location area information of the UE, local network information that needs to be sent to the UE.

Optionally, in another implementation, the processing unit 1102 is configured such that when the local network access indication information indicates that the UE is allowed to access a local network, the processing unit 1102 obtains local network information corresponding to the location area information of the UE from configured local network information or from a first network element.

Optionally, in still another implementation, the obtaining unit 1101 is further configured to obtain location area information of the UE. Additionally, the processing unit 1102 is configured to determine, based on obtained local network information, the local network identification information, and the location area information of the UE, local network information that needs to be sent to the UE.

Optionally, in yet another implementation, the processing unit 1102 is configured to: obtain, based on the local network identification information, local network service coverage information corresponding to the identifier; and when configured or stored local network information includes the local network identification information and the service coverage information corresponding to the local network identification information includes the location area information of the UE, determine that the local network information available to the UE is the local network service coverage information. Alternatively, the processing unit 1102 is configured to: determine, from configured or stored local network information, corresponding first local network identification information based on the location area information of the UE; and when the first local network identification information includes the local network identification information, determine that the local network information available to the UE is the local network service coverage information.

Figure 11:
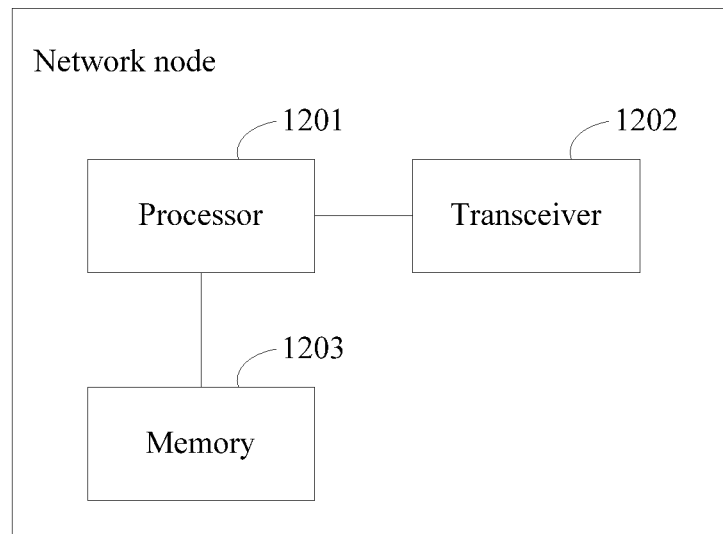
FIG. 11 is a schematic structural diagram of a network node according to an embodiment of this application.

During implementation, this application further provides a network node, such as a control plane node. As shown in FIG. 11, the node includes a processor 1201, a transceiver 1202, and a memory 1203.

The transceiver 1202 is configured to obtain first information, where the first information includes local network access indication information or local network identification information. The processor 1201 is configured to determine local network information available to a UE. The transceiver 1202 is further configured to send the local network information to the UE.

Optionally, in an implementation, the transceiver 1202 is further configured to obtain location area information of the UE. Additionally, the processor 1201 is configured to determine the local network information available to the UE based on local network information obtained by the network node, the local network access indication information, and the location area information of the UE.

Optionally, in another implementation, the processor 1201 is configured such that when the local network access indication information indicates that the UE is allowed to access a local network, the processor 1201 obtains local network information corresponding to the location area information of the UE from configured local network information or from a first network element.

Optionally, in still another implementation, the transceiver 1202 is further configured to obtain location area information of the UE. Additionally, the processor 1201 is configured to determine the local network information available to the UE based on local network information obtained by the network node, the local network identification information, and the location area information of the UE.

Optionally, in yet another implementation, the processor 1201 is configured to: obtain, based on the local network identification information, local network service coverage information corresponding to the identifier; and when the obtained local network information includes the local network identification information and the service coverage information corresponding to the local network identification information includes the location area information of the UE, determine that the local network information available to the UE is the local network service coverage information. Alternatively, the processor 1201 is configured to: determine, from the obtained local network information, corresponding first local network identification information based on the location area information of the UE; and when the first local network identification information includes the local network identification information, determine that the local network information available to the UE is the local network service coverage information.

The processor, the transceiver, and the memory may be the same as the functional components shown in FIG. 6, and details are not described in this embodiment.

The processor is configured to control an instruction stored in the memory to implement functions of the control plane node in the foregoing method embodiments of this application. The storage memory may be a magnetic disk, an optical disc, a read-only memory (ROM), a random access memory (RAM), or the like. In addition, a base station and a terminal such as UE may be further included. The base station and the terminal have same structures as the base station and the UE in the foregoing embodiments. Details are not described again.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the processes or functions according to the embodiments of this application are performed. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired or wireless manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

For same or similar parts between the embodiments in this specification, refer to each other. The foregoing embodiments are similar to the method embodiments, and therefore are described relatively briefly. For related parts, reference may be made to descriptions in the method embodiments.

The foregoing implementations of the present disclosure are not intended to limit the protection scope of the present disclosure.

What is claimed is:

1. A communication method, wherein the method comprises:
   obtaining, by a control plane node, identification information about a requested local network from a user equipment (UE) and location area information of the UE;
   determining, by the control plane node, that the identification information about the requested local network is included in local network information configured or stored in the control plane node, wherein service coverage information corresponding to the requested local network in the local network information comprises the location area information of the UE; and
   sending, by the control plane node, the service coverage information corresponding to the requested local network to the UE,
   wherein the control plane node comprises an access and mobility management function entity or a Session Management Function entity.

2. The method according to claim 1, wherein the identification information about the requested local network is a name of the requested local network.

3. The method according to claim 1, wherein the requested local network comprises one or more local networks.

4. The method according to claim 1, wherein the local network information comprises a local network identifier identifying a local network and additional service coverage information corresponding to the local network.

5. The method according to claim 1, further comprising:
   sending, by the control plane node, the service coverage information to a base station; and
   sending, by the base station, the service coverage information to the UE.

6. A communications apparatus, comprising:
   at least one processor; and
   a computer readable medium in communication with the at least one processor, the computer readable medium storing computer readable instructions that, when executed by the at least one processor, cause the communications apparatus to:
   obtain identification information about a requested local network from a user equipment (UE) and location area information of the UE;
   determine that the identification information about the requested local network is included in local network information configured or stored in a control plane node, wherein service coverage information corresponding to the requested local network in the local network information comprises the location area information of the UE; and
   send the service coverage information corresponding to the requested local network to the UE,
   wherein the communications apparatus comprises an access and mobility management function entity or a Session Management Function entity.

7. The communications apparatus according to claim 6, wherein the identification information about the requested local network is a name of the requested local network.

8. The communications apparatus according to claim 6, wherein the requested local network comprise one or more local networks.

9. The communications apparatus according to claim 6, wherein the local network information comprises a local network identifier identifying a local network and additional service coverage information corresponding to the local network.

10. A communication system, comprising:
a base station; and
a control plane node configured to:
    obtain identification information about a requested local network from a user equipment (UE) and location area information of the UE;
    determine that the identification information about the requested local network is included in local network information configured or stored in the control plane node, service coverage information corresponding to the requested local network in the local network information comprises the location area information of the UE; and
    send the service coverage information corresponding to the requested local network to the base station,
wherein the base station is configured to receive the service coverage information from the control plane node, and
wherein the control plane node comprises an access and mobility management function entity or a Session Management Function entity.

11. The communication system according to claim 10, wherein the identification information about the requested local network is a name of the requested local network.

12. The communication system according to claim 10, wherein the requested local network comprises one or more local networks.

13. The communication system according to claim 10, wherein the local network information comprises a local network identifier identifying a local network and additional service coverage information corresponding to the local network.

* * * * *